(12) United States Patent
Roy et al.

(10) Patent No.: US 10,485,254 B2
(45) Date of Patent: Nov. 26, 2019

(54) FRUIT AND VEGETABLE PRODUCTS

(71) Applicant: Ocean Spray Cranberries, Inc., Lakeville-Middleboro, MA (US)

(72) Inventors: Soumya Roy, Lakeville-Middleboro, MA (US); Noman Khan, Lakeville-Middleboro, MA (US); Barbara Vazquez del Mercado, Lakeville-Middleboro, MA (US); Kellie Denson, Lakeville-Middleboro, MA (US)

(73) Assignee: Ocean Spray Cranberries, Inc., Lakeville-Middleboro, MA (US)

( * ) Notice: Subject to any disclaimer, the term of this patent is extended or adjusted under 35 U.S.C. 154(b) by 0 days.

(21) Appl. No.: 15/448,535

(22) Filed: Mar. 2, 2017

(65) Prior Publication Data

US 2017/0265508 A1 Sep. 21, 2017

Related U.S. Application Data

(60) Provisional application No. 62/303,334, filed on Mar. 3, 2016, provisional application No. 62/304,059, filed
(Continued)

(51) Int. Cl.
*A23L 19/00* (2016.01)
*A23L 33/10* (2016.01)
(Continued)

(52) U.S. Cl.
CPC ............ *A23L 19/03* (2016.08); *A23B 7/02* (2013.01); *A23B 7/024* (2013.01); *A23B 7/148* (2013.01);
(Continued)

(58) Field of Classification Search
CPC .......... A23L 19/03; A23L 33/10; A23L 33/30; A23L 3/44
(Continued)

(56) References Cited

U.S. PATENT DOCUMENTS

| | | | | |
|---|---|---|---|---|
| 2,091,372 A | * | 8/1937 | Moore | ..................... A23B 7/02 34/402 |
| 2,899,319 A | * | 8/1959 | Powers et al. ......... A23B 7/024 34/305 |

(Continued)

OTHER PUBLICATIONS

International Search Report and Written Opinion in International Application No. PCT/US2017/020490, dated Jun. 27, 2017, 20 pages.

(Continued)

*Primary Examiner* — Helen F Heggestad
(74) *Attorney, Agent, or Firm* — Fish & Richardson P.C.

(57) ABSTRACT

A method for producing a fruit or vegetable product, wherein the method consists essentially of (a) infusing a whole or sliced fruit or vegetable with an infusible molecule to between 10 and 55° Brix; (b) pre-drying the whole or sliced fruit or vegetable at a temperature between 80° C. and 120° C. to produce a pre-dried fruit or vegetable; (c) exposing the pre-dried fruit or vegetable to freezing temperatures and to vacuum to a temperature between −1° C. and −40° C. and a pressure between 7.5 mmHg and 0.53 mmHg, thereby partially subliming the fruit or vegetable; (d) puffing the fruit or vegetable under vacuum between 0.1 mmHg and 600 mmHg at a temperature between 40° C. and 110° C.; (e) cooling the fruit or vegetable under vacuum to a temperature between 0° C. and 40° C., to thereby produce the fruit or vegetable product.

52 Claims, 12 Drawing Sheets

Related U.S. Application Data on Mar. 4, 2016, provisional application No. 62/344,130, filed on Jun. 1, 2016, provisional application No. 62/438,359, filed on Dec. 22, 2016.

(51) Int. Cl.
| | | |
|---|---|---|
| *A23L 5/30* | (2016.01) | |
| *A23L 3/44* | (2006.01) | |
| *A23B 7/02* | (2006.01) | |
| *A23B 7/024* | (2006.01) | |
| *A23B 7/148* | (2006.01) | |
| *A23L 5/10* | (2016.01) | |

(52) U.S. Cl.
CPC ........ *A23L 3/44* (2013.01); *A23L 5/17* (2016.08); *A23L 5/30* (2016.08); *A23L 33/10* (2016.08); *A23V 2002/00* (2013.01)

(58) Field of Classification Search
USPC .................................. 426/103, 615, 639, 640
See application file for complete search history.

(56) References Cited

U.S. PATENT DOCUMENTS

| | | |
|---|---|---|
| 3,395,022 A | 7/1968 | Vorink et al. |
| 3,467,530 A * | 9/1969 | Kenyon et al. |
| 4,341,803 A | 7/1982 | Koshida et al. |
| 4,520,574 A * | 6/1985 | Sugisawa .............. A23L 3/0155 |
| | | 34/289 |
| 4,713,252 A | 12/1987 | Ismail |
| 6,312,745 B1 | 11/2001 | Durance et al. |
| 6,440,449 B1 | 8/2002 | Hirschberg |
| 2006/0013925 A1* | 1/2006 | Bauman et al. |
| 2010/0009060 A1 | 1/2010 | Smith |
| 2011/0086145 A1 | 4/2011 | Rodriguez et al. |
| 2013/0040024 A1 | 2/2013 | Fletcher et al. |
| 2013/0171324 A1 | 7/2013 | Palacio et al. |
| 2016/0095329 A1* | 4/2016 | Roos |

OTHER PUBLICATIONS

International Preliminary Report on Patentability in Application No. PCT/US2017/020490, dated Sep. 4, 2018, 13 pages.

Sosa et al., "Physico-Chemical and 15 mechanical properties of apple discs subjected to osmotic dehydration and different drying methods," Food and Bioprocess Technology 5(5):1790-1802, Nov. 20, 2010.

\* cited by examiner

FRUIT AND VEGETABLE PRODUCTS

CROSS REFERENCE TO RELATED APPLICATIONS

This application claims priority to U.S. Application No. 62/303,334, filed on Mar. 3, 2016, U.S. Application No. 62/304,059, filed on Mar. 4, 2016, U.S. Application No. 62/344,130, filed on Jun. 1, 2016, and U.S. Application No. 62/438,359, filed on Dec. 22, 2016, the contents of which are hereby incorporated by reference in their entirety.

TECHNICAL FIELD

The present disclosure provides, inter alia, fruit and vegetable products and methods of making the fruit and vegetable products.

BACKGROUND

Dried fruits and vegetables have gained popularity as a nutritious snack, but fruits and vegetables that are fried have a high fat content and are unhealthy and unappetizing. Most fruit and vegetable snacks that are not fried are chewy rather than crunchy. While fresh fruits and vegetables contain more than 80% water, crunchy snacks require moisture removal down to approximately 1% to 7% moisture. Large amounts of moisture removal upon drying results in shriveling and shrinking of the fruit or vegetable, making the product less palatable. Freeze-drying fruits and vegetables, which utilizes conduction and/or radiation heating and, as a result, tends to be an extremely slow and inefficient process, retains the general shape of the dried fruit or vegetable, but non-infused/commercially available, dried fruits and vegetables typically have a crumbly texture rather than a more appealing crunchy texture. The present invention provides fruit and vegetable products that are puffy and crunchy, while retaining most of their original shape and volume.

SUMMARY

The present disclosure is based, in part, on the discovery that puffy, crunchy fruit and vegetable products can be produced by treating fruits and vegetables to create a pressure differential between the inside and outside of the fruits and vegetables, for example, using sub-atmospheric pressure. These treatments expand the fruits and vegetables and, upon drying, cause the fruits and vegetables to take on a glassy, crunchy texture. Accordingly, in one aspect, the present specification provides methods of making fruit and vegetable products. The methods include, for example exposing a whole or sliced fruit or vegetable under vacuum to heat at a temperature of about 26° C. to about 110° C., wherein the vacuum creates an atmosphere of about 0.1 mmHg to about 600 mmHg, to thereby expand the whole or sliced fruit or vegetable; dehydrating the whole or sliced fruit or vegetable under vacuum that creates an atmosphere of about 0.1 mmHg to about 600 mmHg to a moisture content of about 1% to about 15%; and cooling the whole or sliced fruit or vegetable under vacuum that creates an atmosphere of about 0.1 mmHg to about 600 mmHg to a temperature of about 0° C. to about 40° C., to thereby produce the fruit or vegetable product.

In one embodiment the methods include scarifying, pricking, slicing, or scraping the whole or sliced fruit or vegetable prior to exposing the whole or sliced fruit or vegetable under vacuum to heat. In some embodiments, the methods include extracting juice from the whole or sliced fruit or vegetable prior to exposing the whole or sliced fruit or vegetable under vacuum to heat. In one embodiment, the methods include infusing the whole or sliced fruit or vegetable with an infusible molecule prior to exposing the whole or sliced fruit or vegetable under vacuum to heat. In some embodiments, the infusible molecule is selected from the group consisting of a monosaccharide, disaccharide, trisaccharide, oligosaccharide, polysaccharide, fiber, vitamins, minerals, proteins, flavors, salt, seasoning, or any combination thereof.

In some embodiments, the methods include pre-drying the whole or sliced fruit or vegetable prior to exposing the whole or sliced fruit or vegetable under vacuum to heat, e.g. at a temperature of about 70° C. to about 120° C. In some embodiments, the methods include pre-drying the whole or sliced fruit or vegetable to a moisture content of about 25% or above. In some embodiments, the methods include pre-drying the whole or sliced fruit or vegetable with a convection dryer, air dryer, impingement dryer, microwave, infrared dryer, and/or air impinger.

In some embodiments, the methods include exposing the whole or sliced fruit or vegetable under vacuum to heat at a temperature of about 26° C. to about 110° C. is performed with convection or conduction heating or infrared or microwave radiation.

In some embodiments, the methods include exposing the whole or sliced fruit or vegetable under vacuum to heat at a temperature of about 80° C.-90° C.

In some embodiments, the vacuum pressure is about 0.1 mmHg to about 100 mmHg.

In some embodiments, the methods include the whole or sliced fruit or vegetable is an infused fruit or vegetable. In some embodiments, the methods include the infused fruit or vegetable is infused with a monosaccharide, disaccharide, trisaccharide, oligosaccharide, polysaccharide, fiber, vitamins, minerals, proteins, flavors, salt, seasoning, or any combination thereof.

In some embodiments, the whole or sliced fruit or vegetable is a cranberry, a blueberry, an elderberry, a chokeberry, a lingonberry, a raspberry, or a grape.

In some embodiments, the methods include coating the whole or sliced fruit or vegetable with sugar, spices, seasoning, oil, oil blend, chocolate, yogurt, flavorings, natural flavorings, or any combination thereof.

In some embodiments, the methods include dehydrating the whole or sliced fruit or vegetable under vacuum to a moisture content of about 1% to about 7%. In some embodiments, the methods include dehydrating the whole or sliced fruit or vegetable under vacuum to a moisture content of about 7% to about 15%.

In one aspect, the present specification provides fruit or vegetable product produced by any of the methods herein.

In still another aspect, the present specification provides methods for producing fruit and vegetable products where the method includes pre-drying a whole or sliced fruit or vegetable; puffing the whole or sliced fruit or vegetable under vacuum at a temperature above 21° C.; freeze-drying the whole or sliced fruit or vegetable under vacuum to a moisture content of about 1% to about 15%; and subliming the whole or sliced fruit or vegetable under vacuum, to thereby produce the fruit or vegetable product.

In some embodiments, the methods include scarifying, pricking, slicing, or scraping the whole or sliced fruit or vegetable prior to exposing the whole or sliced fruit or vegetable under vacuum to expand and dehydrate. In some embodiments, the methods include extracting juice from the whole or sliced fruit or vegetable prior to exposing the whole or sliced fruit or vegetable under vacuum to heat. In some embodiments, the methods include infusing the whole or sliced fruit or vegetable with an infusible molecule prior to exposing the whole or sliced fruit or vegetable under vacuum to heat. In some embodiments the infusible molecule is selected from the group consisting of a monosaccharide, disaccharide, trisaccharide, oligosaccharide, polysaccharide, fiber, vitamins, minerals, proteins, flavors, salt, seasoning, or any combination thereof.

In some embodiments, the methods include pre-drying the whole or sliced fruit or vegetable at a temperature of about 70° C. to about 120° C. In some embodiments, the methods include pre-drying the whole or sliced fruit or vegetable to a moisture content of about 25% or above. In some embodiments, the methods include pre-drying the whole or sliced fruit or vegetable with a convection dryer, air dryer, impingement dryer, microwave, infrared dryer, and/or air impinger.

In some embodiments, the methods include exposing the whole or sliced fruit or vegetable under vacuum to heat at a temperature of about 26° C. to about 110° C. with convection or conduction heating or infrared or microwave radiation. In some embodiments, the methods include exposing the whole or sliced fruit or vegetable under vacuum to heat at a temperature of about 90° C.

In some embodiments, the vacuum pressure is about 0.1 mmHg to about 100 mmHg.

In some embodiments, the whole or sliced fruit or vegetable is an infused fruit or vegetable. In some embodiments, the infused fruit or vegetable is infused with a monosaccharide, disaccharide, trisaccharide, oligosaccharide, polysaccharide, vitamins, minerals, proteins, flavors, salt, seasoning, or any combination thereof.

In some embodiments, the whole or sliced fruit or vegetable is a cranberry, a blueberry, an elderberry, a chokeberry, a lingonberry, a raspberry, or a grape.

In some embodiments, the methods include coating the whole or sliced fruit or vegetable with sugar, spices, seasoning, oil, oil blend, chocolate, yogurt, flavorings, natural flavorings, or any combination thereof.

In some embodiments, the methods include freeze-drying the whole or sliced fruit or vegetable under vacuum to a moisture content of about 1% to about 7%. In some embodiments, the methods include freeze-drying the whole or sliced fruit or vegetable under vacuum to a moisture content of about 7% to about 15%.

In one aspect, the present specification provides fruit or vegetable product produced by any of the methods herein.

In still another aspect, the present specification features a berry product with a moisture content of about 1% to about 15%; and a hardness of about 500 g to about 15000 g.

In some embodiments, the berry comprises a moisture content of about 1% to about 7%. In some embodiments, the berry comprises a moisture content of about 5%.

In some embodiments, the berry comprises a porosity of about 0.4% to about 0.8%.

In some embodiments, the berry comprises a bulk density of about 0.1 to 0.3 g/cc, an apparent density of about 0.2 to about 0.5 g/cc, and a true density of about 0.8 to about 1.2 g/cc.

In some embodiments, the berry is a cranberry, a blueberry, an elderberry, a chokeberry, a lingonberry, or a raspberry.

In some embodiments, the berry product further includes a coating of sugar, spices, seasoning, oil, oil blend, chocolate, yogurt, flavorings, natural flavorings, or any combination thereof.

In still another aspect, the present disclosure provides a method for producing a fruit or vegetable product, wherein the method includes exposing a fruit or vegetable under vacuum to heat at a temperature of about 80° C. for a first time period followed by 50° C. for a second time period, wherein the vacuum creates an atmosphere of about 0.7 to about 10 mbar, to thereby produce the fruit or vegetable product.

In some embodiments, the methods include infusing a fruit or vegetable with an infusion formulation to about 10 to 30° Brix.

In some embodiments, the methods include pre-drying the fruit or vegetable to about 40 to 55° Brix; freezing the fruit or vegetable at about −1° C. to about 40° C.;

In some embodiments, the methods include extracting juice from the whole or sliced fruit or vegetable prior to infusing. In some embodiments, the methods include infusing with an infusible molecule selected from the group consisting of a monosaccharide, disaccharide, trisaccharide, oligosaccharide, polysaccharide, or any combination thereof.

In some embodiments, pre-drying is performed with a convection dryer, air dryer, impingement dryer, microwave, infrared dryer, and/or air impinger.

In some embodiments, the methods include exposing the fruit or vegetable under vacuum to heat with convection or conduction heating or infrared or microwave radiation.

In some embodiments, the fruit or vegetable is a cranberry, a blueberry, an elderberry, a chokeberry, a lingonberry, a raspberry, or a grape.

In another aspect, the present specification provides for a fruit or vegetable product produced by the methods herein.

In still another aspect, the present disclosure provides a method for producing a fruit or vegetable product, wherein the method comprises exposing a whole or sliced fruit or vegetable under vacuum to a temperature of about −40° C. to about 110° C., wherein the vacuum creates an atmosphere of about 0.1 mmHg to about 600 mmHg, to thereby expand the whole or sliced fruit or vegetable; dehydrating the whole or sliced fruit or vegetable under vacuum that creates an atmosphere of about 0.1 mmHg to about 600 mmHg to a moisture content of about 1% to about 15%; and cooling the whole or sliced fruit or vegetable under vacuum that creates an atmosphere of about 0.1 mmHg to about 600 mmHg to a temperature of about 0° C. to about 40° C., to thereby produce the fruit or vegetable product.

In some embodiments, the methods include scarifying, pricking, slicing, or scraping the whole or sliced fruit or vegetable prior to exposing the whole or sliced fruit or vegetable under vacuum. In some embodiments, the methods include extracting juice from the whole or sliced fruit or vegetable prior to exposing the whole or sliced fruit or vegetable under vacuum. In some embodiments, the methods include infusing the whole or sliced fruit or vegetable with an infusible molecule prior to exposing the whole or sliced fruit or vegetable under vacuum. In some embodiments, the infusible molecule is selected from the group consisting of a monosaccharide, disaccharide, trisaccharide, oligosaccharide, polysaccharide, fiber, vitamins, minerals, proteins, flavors, salt, seasoning, or any combination thereof.

In some embodiments, the methods include pre-drying the whole or sliced fruit or vegetable prior to exposing the whole or sliced fruit or vegetable under vacuum. In some embodiments, the methods include pre-drying the whole or sliced fruit or vegetable at a temperature of about 70° C. to about 120° C. In some embodiments, the methods include pre-drying the whole or sliced fruit or vegetable to a moisture content of about 25% or above.

In some embodiments, the methods include pre-drying the whole or sliced fruit or vegetable with a convection dryer, air dryer, impingement dryer, microwave, infrared dryer, and/or air impinger.

In some embodiments, the methods include exposing the whole or sliced fruit or vegetable under vacuum to heat at a temperature of about −40° C. to about 110° C. with convection or conduction heating or infrared or microwave radiation. In some embodiments, the methods include exposing the whole or sliced fruit or vegetable under vacuum to heat at a temperature of 80° C.-90° C.

In some embodiments, the vacuum pressure is about 0.1 mmHg to about 100 mmHg.

In some embodiments, the whole or sliced fruit or vegetable is an infused fruit or vegetable. In some embodiments, the infused fruit or vegetable is infused with a monosaccharide, disaccharide, trisaccharide, oligosaccharide, polysaccharide, fiber, vitamins, minerals, proteins, flavors, salt, seasoning, or any combination thereof.

In some embodiments, the whole or sliced fruit or vegetable is a cranberry, a blueberry, an elderberry, a chokeberry, a lingonberry, a raspberry, or a grape.

In some embodiments, the methods include coating the whole or sliced fruit or vegetable with sugar, spices, seasoning, oil, oil blend, chocolate, yogurt, flavorings, natural flavorings, or any combination thereof.

In some embodiments, the methods include dehydrating the whole or sliced fruit or vegetable under vacuum to a moisture content of about 1% to about 7%. In some embodiments, the methods include dehydrating the whole or sliced fruit or vegetable under vacuum to a moisture content of about 7% to about 15%.

In another aspect, the present specification provides for a fruit or vegetable product produced by any of the methods herein.

As used herein, the term "fruit" refers to firm fruits, soft fruits, sliced pieces with skin remaining, and/or scarified/pricked/scraped fruit, which are well-known in the art, and described herein. In some instances, the fruit material can be a berry. In some instances, the berry can be cranberry, blueberry, elderberry, chokeberry, lingonberry, raspberry, gooseberry, huckleberry, strawberry, blackberry, cloudberry, grape, blackcurrant, redcurrant, white currant, and/or or any mixture thereof.

"Firm fruits" are fruits that resist structural collapse under substantial compression. Examples include cranberries, apples, and cherries. On the other hand, "soft fruits" are more readily collapsed. Examples include blueberries, raspberries, blackberries, kiwi, guava, mango, and passion.

As used herein, the term "berry" refers to fruits that are well-known in the art, and described herein. In some instances, the berry can be cranberry, blueberry, elderberry, chokeberry, lingonberry, raspberry, gooseberry, huckleberry, strawberry, blackberry, cloudberry, grape, blackcurrant, redcurrant, white currant, and/or or any mixture thereof. Other fruits are amenable to treatment in accordance with the presently described methods, such as cherries, mango, pineapple, kiwi, guava, date, apple, apricot, plum, prune, pear, passion, and peach, among others.

"Vegetables" can include cabbage, turnip, radish, carrot, celery, parsnip, beetroot, lettuce, beans, peas, potato, eggplant, tomato, cucumber, squash, onion, garlic, leek, pepper, spinach, yam, sweet potato, and cassava.

Unless otherwise defined, all technical terms used herein have the same meaning as commonly understood by one of ordinary skill in the art to which this invention belongs. Methods and materials are described herein for use in the present invention; other suitable methods and materials known in the art can also be used. The methods, materials, and examples are illustrative only and not intended to be limiting. All publications, patent applications, patents, and other references mentioned herein are incorporated by reference in their entirety. In case of conflict, the present specification, including definitions, will control.

Other features and advantages of the invention will be apparent from the following detailed description and figures, and from the claims.

DETAILED DESCRIPTION

Dried fruits and vegetables have gained popularity as a nutritious snack, but removal of large amounts of moisture to produce dried fruits and vegetables results in shriveled and shrunken fruits and vegetables, making the product less appealing. While freeze-dried fruits and vegetables may retain the general shape of the original fruits and vegetables, freeze-drying requires a high energy cost of operation, and it can be an extremely slow process. Moreover, commercially-available freeze-dried fruits and vegetables have a crumbly texture rather than a more appealing crunchy texture. The present disclosure provides efficient methods to dry fruits and vegetables and produce fruit and vegetable products that can be characterized as puffy and crunchy.

Fruit and Vegetable Products

Fruit and vegetable products, as described herein, are fruits and vegetables that retain most of its original shape and volume, e.g., greater than or about 55%, 60%, 65%, 70%, 75%, 80%, 85%, 90%, or greater than or about 95% of the volume of the original fruit and vegetable. In one embodiment, the fruit and vegetable products contain whole fruits or whole vegetables. In some embodiments, the fruit and vegetable products are slices, wedges, or chunks of fruits or vegetables. In some embodiments, the fruit and vegetable products have a moisture content of about 1% to about 7% moisture, e.g., about 1% to about 2%, about 1% to about 3%, about 1% to about 4%, about 1% to about 5%, about 2% to about 4%, about 2% to about 5%, about 3% to about 6%, about 4% to about 7%, about 5% to about 7%, or about 1%, 2%, 3%, 4%, 5%, 6%, or about 7%. See, Table. In other embodiments, the fruit and vegetable products have a moisture content of about 7% to about 15% moisture, e.g., about 8% to about 14%, about 9% to about 13%, or about 10% to about 12%. While berries are used as an example, skilled practitioners will appreciate that the methods described herein can be readily adapted to be performed on any fruit or vegetable described herein. Whole berries include, e.g., berries that have not been processed in any way, berries that have been extracted to remove juice, and berries that have been extracted to remove juice and subsequently infused with an infusion syrup comprising sugar and/or other infusible molecules, e.g., fiber or maltodextrin.

TABLE

Properties of an Example of a Puffy, Crunchy Cranberry Product

| PROPERTY | VALUE |
| --- | --- |
| Moisture Content | 1-7% |
| Hardness | 500-15000 g |
| Porosity | 0.4-0.8% |
| Bulk Density | 0.1-0.4 g/cc |
| Apparent Density | 0.2-0.7 g/cc |
| True Density | 0.3-1.5 g/cc |

Figure 1:
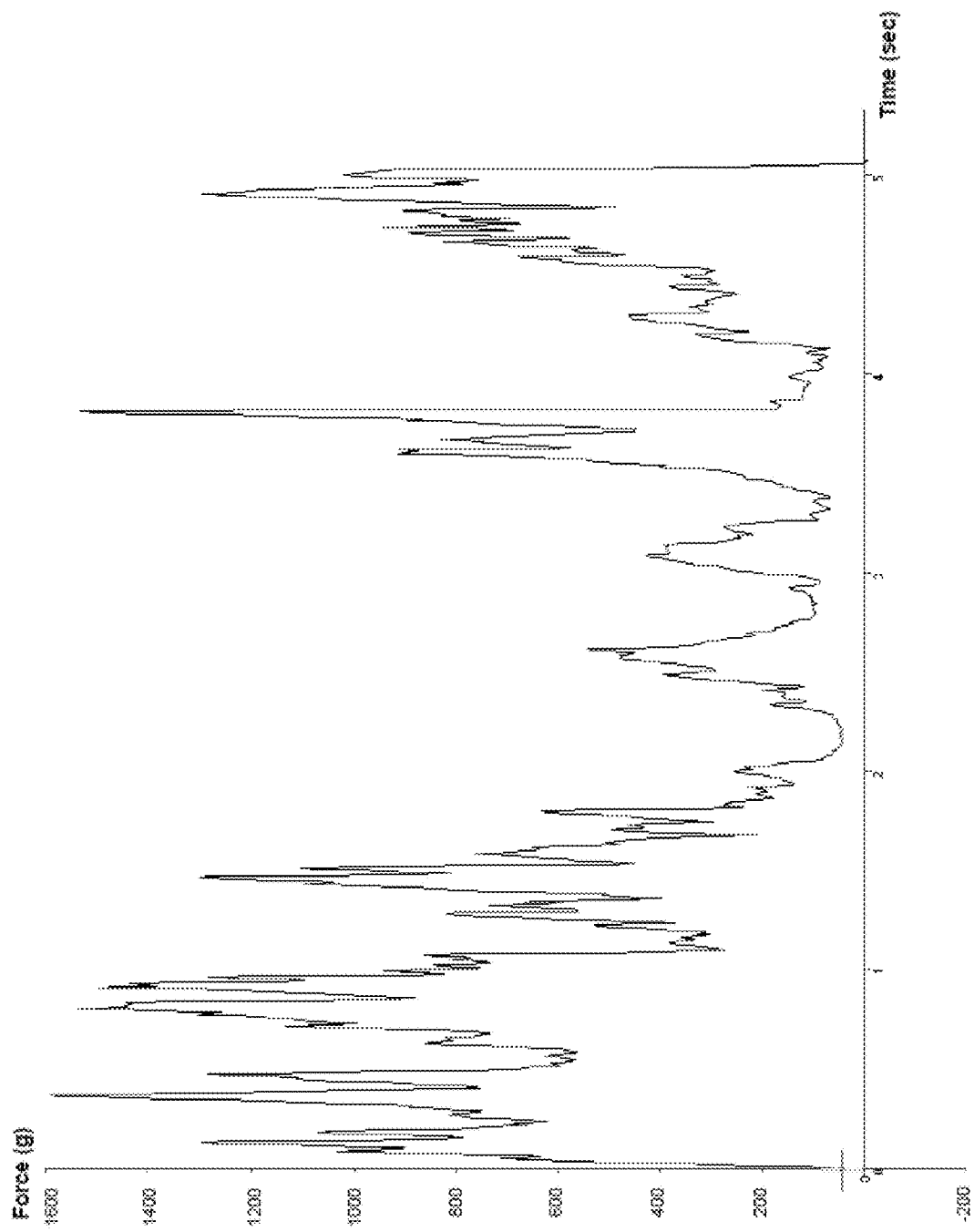
FIG. 1 is a line graph showing the texture analysis profile of an infused, puffed, and crunchy cranberry produced by the methods described herein.
Figure 2:
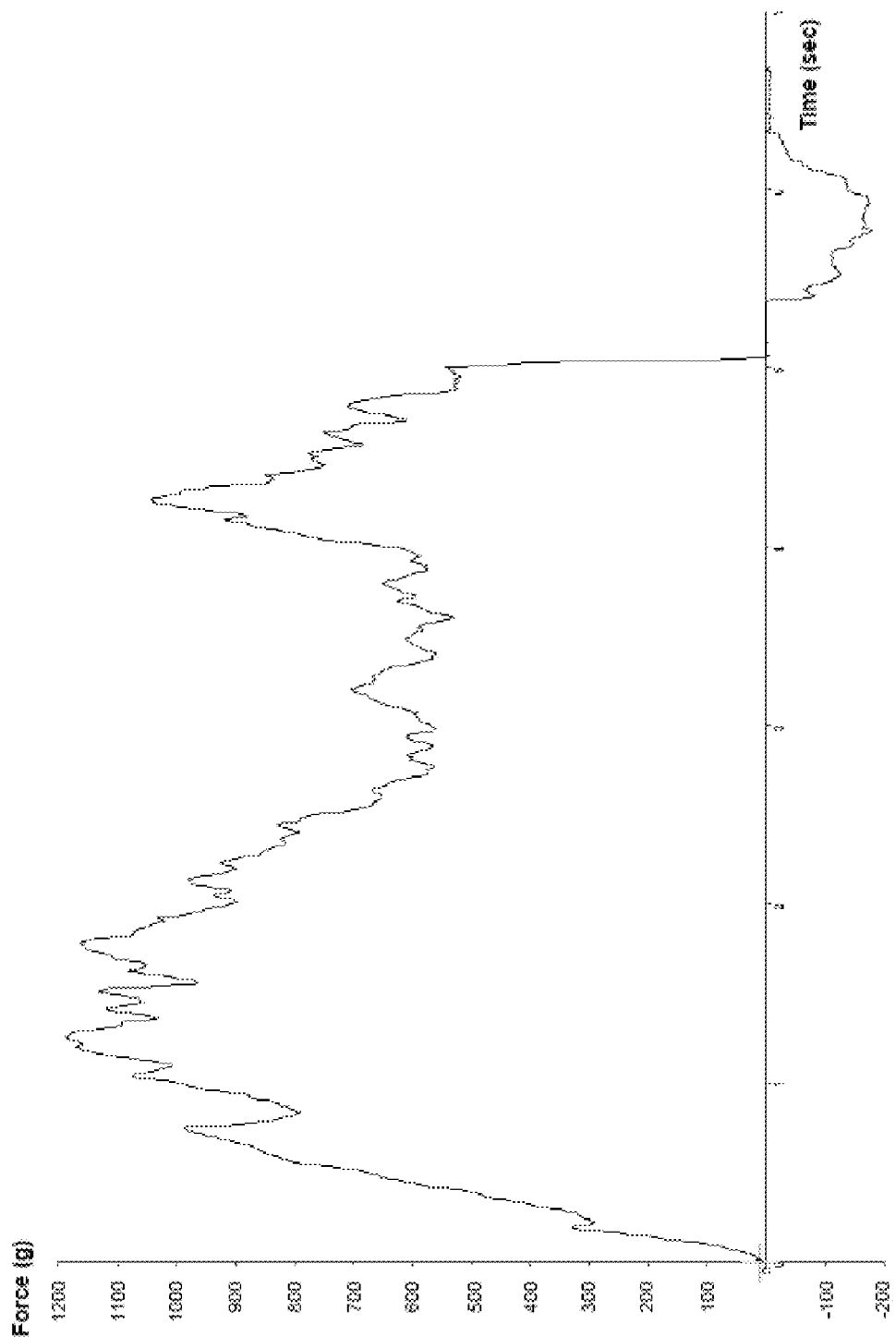
FIG. 2 is a line graph showing the texture analysis profile of a commercially-available non-infused freeze dried cranberries.

The fruit and vegetable products produced using the methods described herein have unique characteristics. In one embodiment, they are relatively crunchy, e.g., as compared to fruit or vegetable that has been simply dried using a prior art method, which typically have a crumbly/powdery texture. The products can have a hardness of about 500 to about 5000 g, e.g., about 1100 to about 4900 g, about 1500 to about 4500 g, about 2000 to about 4000 g, or about 2500 to about 3500 g. Other products produced by the present methods have a hardness of about 500 to about 15000 g, e.g., about 600 to about 14000 g, about 700 to about 13000 g, about 800 to about 12000 g, about 900 to about 11000 g, about 1000 to about 10000 g, about 1100 to about 9000 g, about 600 to about 9000 g, about 700 to about 8000 g, about 700 to about 7000 g, about 800 to about 6000 g, about 900 to about 5000 g, about 1000 to about 4000 g, about 1100 to about 3000 g, about 1200 to about 2000 g, or about 1000 g, 1200 g, 1500 g, 1700 g, 2000 g, 2500 g, 3000 g, 3500 g, 4000 g, 4500 g, or about 7000 g. Skilled practitioners will appreciate that while the peak force required to break a commercially-available freeze-dried fruit or vegetable (which can be referred to as the hardness of the fruit or vegetable) might be similar in value to the products produced by the presently described methods, the nature of force required to break the presently described products is different from a commercially-available freeze-dried fruit or vegetable. FIG. 1 represents the force required (in grams) to break an exemplary infused cranberry made by the present methods, whereas FIG. 2 represents the force required (in grams) to break a commercially-available freeze-dried cranberry. While both products require a somewhat similar breaking force, the peaks of force needed to break infused, crunchy cranberries made by the present methods, as represented in FIG. 1, are much sharper than the peaks of force required to break the commercially-available freeze-dried cranberry, as represented in FIG. 2. The sharp peaks in the texture data corroborates sensory characteristics of the product made using the present invention which was crunchy, rather than mealy and crumbly products made with traditional freeze-drying process available commercially. Moreover, the commercially-available freeze-dried cranberry was found to show negative force at the end of the test at about 5.5 to 6 seconds in FIG. 2, which was absent in the products made using the present invention. Skilled practitioners will appreciate some variability with fruits and vegetables, hence a very high or low force may occasionally be required to break the products described herein.

The fruit and vegetable products can have a porosity of about 0.4 to about 0.8%, e.g., about 0.45 to about 0.75%, about 0.5 to about 0.7%, or about 0.55 to about 0.65%. For example, the fruit or vegetable products can have a porosity of about 0.41%, 0.42%, 0.43%, 0.44%, 0.45%, 0.46%, 0.47%, 0.48%, or about 0.49%. The fruit and vegetable products can have a bulk density of about 0.1 to about 0.4 g/cc, e.g., about 0.11 to about 0.29 g/cc, about 0.13 to about 0.27 g/cc, about 0.19 to about 0.26 g/cc, about 0.25 to about 0.4 g/cc, about 0.3 to about 0.4 g/cc, about 0.1 to about 0.35 g/cc, about 0.2 to about 0.35 g/cc, or about 0.25 g/cc, 0.3 g/cc, or about 0.35 g/cc. The products can have an apparent density of, for example, about 0.2 g/cc to about 0.7 g/cc, e.g., about 0.25 g/cc to about 0.45 g/cc, about 0.28 g/cc to about 0.42 g/cc, about 0.3 g/cc to about 0.65 g/cc, about 0.4 g/cc to about 0.7 g/cc, about 0.5 g/cc to about 0.7 g/cc, about 0.6 g/cc to about 0.7 g/cc, or about 0.2 g/cc, 0.3 g/cc, 0.4 g/cc, 0.5 g/cc, 0.6 g/cc, or about 0.7 g/cc. The products can have a true density of, for example, about 0.3 g/cc to about 1.5 g/cc, e.g., about 0.6 g/cc to about 1.4 g/cc, about 0.7 g/cc to about 1.3 g/cc, about 0.8 g/cc to about 1.2 g/cc, about 0.9 g/cc to about 1.1 g/cc, about 0.5 g/cc to about 1.5 g/cc, about 0.3 g/cc to about 1.2 g/cc, about 1.0 g/cc to about 1.5 g/cc, or about 0.3 g/cc, 0.5 g/cc, 0.7 g/cc, 1 g/cc, 1.2 g/cc, or about 1.5 g/cc. In some embodiments, the fruit and vegetable products are puffy, but not crunchy. For example, the puffy, but not crunchy products have a moisture content of about 7% to about 15%, e.g., about 8% to about 14%, about 9% to about 13%, about 10% to about 12%, or about 8%, 9%, 10%, 11%, 12%, 13%, 14%, or about 15%. The puffy, but not crunchy-type products are relatively less hard, e.g., a hardness of about 200 to about 1200 g, have relatively smoother peaks generated in the texture analyzer, but otherwise have similar porosity, bulk density, apparent density, and true density as the puffy, crunchy products.

Skilled practitioners will appreciate that the moisture content, hardness, porosity, and density of the fruit and vegetable products can be determined using a number of methods known in the art. However, exemplary methods that can be used for determining the values described in the present specification are described below.

Bulk density was determined by weighing the sample occupying a specific volume. Apparent Density was determined by measuring the volume of sunflower oil that a sample of pre-weighed product displaced while the product was submerged in the oil in a graduated cylinder. True Density was determined using the above method using sunflower oil and a cylinder, except the sample was crushed to powder using a mortar and pestle before it was submerged in the sunflower oil in a graduated cylinder.

Porosity of the samples was calculated using the following formula:

Porosity=1−(Apparent Density/True Density).

Hardness of a sample was determined by the force it took for an incisor probe ((TA-45) supplied by Texture Technologies, Hamilton, Mass.) attached to a 50 kg load cell to crush the product under a TA.XTplus texture analyzer manufactured by Stable Micro Systems, Surrey, UK. The tests were run under compression mode, with pre-test speed of 1.00 mm/sec, test speed of 2.00 mm/second a trigger force of 100 g. The readout of the TA.XTplus texture analyzer was expressed in grams.

Methods to Produce Fruit and Vegetable Products

Figure 3:
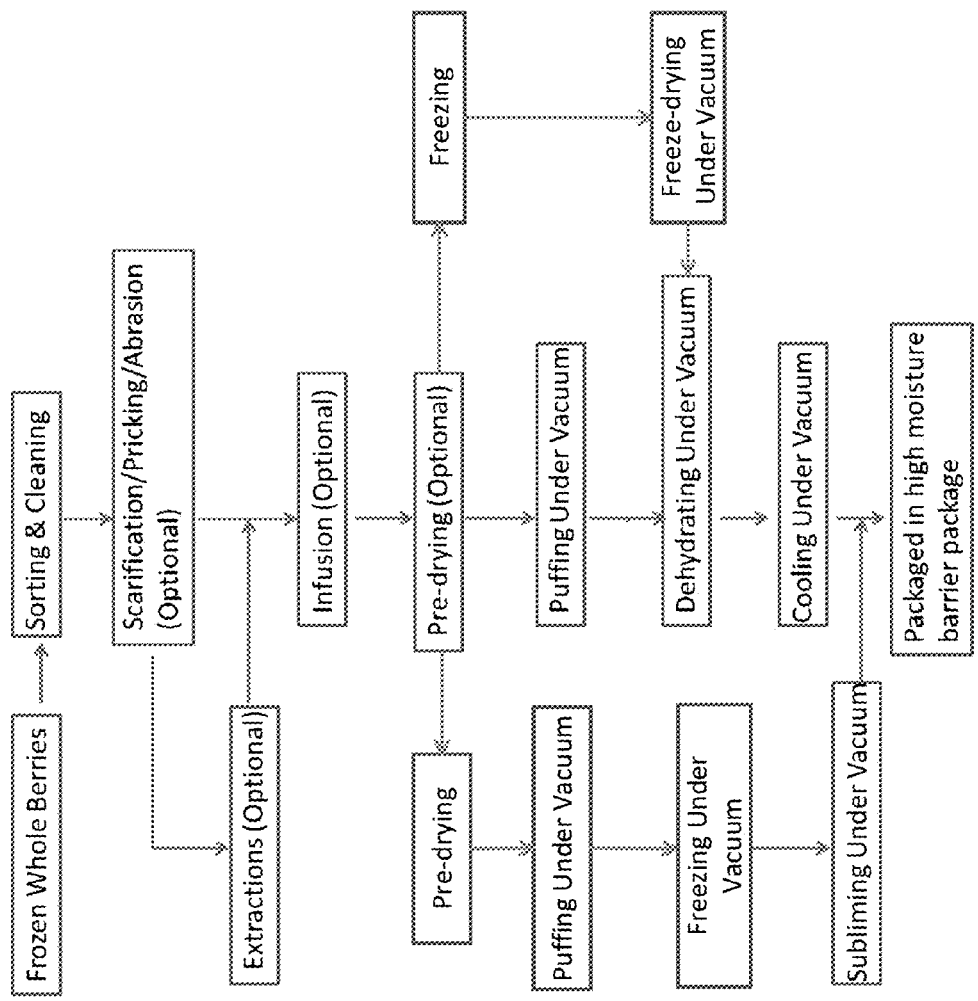
FIG. 3 is a flowchart describing an exemplary method of producing a berry product described herein.
Figure 4:
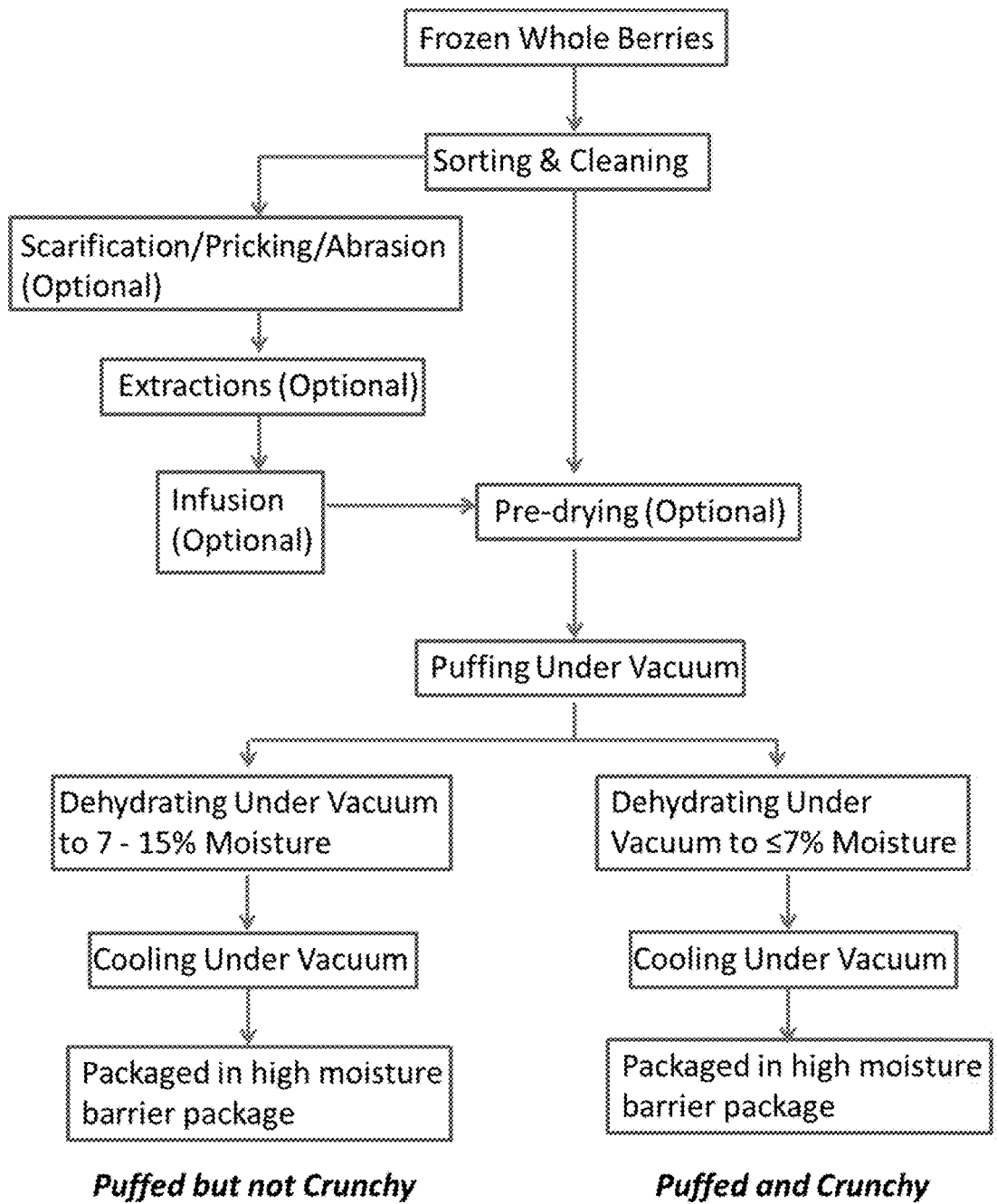
FIG. 4 is a flowchart describing an exemplary method of producing a puffed but not crunchy product and a puffed and crunchy berry product described herein.

The fruit and vegetable products described herein can be produced in a number of ways. Exemplary schemes are described in the flowcharts shown in FIGS. 3 and 4. FIG. 3 shows a scheme that could use a vacuum to dehydrate and cool the fruit or vegetable products. Also shown in FIG. 3, dehydration and cooling can be alternatively accomplished by freeze-drying and sublimation. FIG. 4 depicts two alternative schemes, one that can be used to produce puffy, but not crunchy products, and another scheme that can be used to produce puffy and crunchy products. Whole berries are used for illustrative purposes only, and skilled practitioners will appreciate that the methods described herein can be readily adapted for any fruit or vegetable. Further, while whole berries are used for illustrative purposes, skilled practitioners will appreciate that the methods can also be used on slices (e.g., cranberries cut in roughly half), wedges, or chunks, of any fruit or vegetable described herein. Referring to the flowcharts described in FIGS. 3 and 4, berries, e.g., frozen whole berries, such as cranberries, are sorted and cleaned in preparation for the process. Optionally, berries are then scarified, pricked, and/or abraded. Scarification, pricking, and abrasive methods are well known in the art, and any method can be used in the present methods. Optionally, berries may then be extracted, e.g., using a countercurrent extractor, to extract juice.

To produce a crunchier fruit and vegetable product, a higher solid content in the fruit or vegetable may be useful. While some fruits and vegetables, e.g., grapes, have a high solid content, e.g., a solid content of greater than or about 15° Brix, other fruits and vegetables, e.g., cranberries, have a relatively low solid content, e.g., a solid content of less than or about 10° Brix. To create a crunchier fruit and vegetable product, the fruit or vegetable may optionally be infused, e.g., to about 20° Brix to about 55° Brix, about 30° Brix to about 50° Brix, about 35° Brix to about 45° Brix, about 40° Brix to about 55° Brix, about 45° Brix to about 55° Brix, or about 50° Brix to about 55° Brix, by, for example, using a countercurrent infuser. Any art known method of infusing a berry can be used. Further, the infusion material can include any art-known infusible molecule, e.g., sugar, carbohydrates, maltodextrins, sugar alcohols, soluble fibers, salts such as sodium, calcium, magnesium and/or potassium salts, and/or fruit juices, e.g., apple juice, orange juice, pineapple juice, mango juice, grape juice, guava juice, strawberry juice, banana juice, kiwi juice, watermelon juice, lemon juice, and/or pomegranate juice. Some infusible molecules will produce a crunchy, glass structure, e.g., monosaccharides, including aldoses, such as glucose and ketoses, such as fructose or their derivatives, such as allulose (ribo-2-huxulose) or their reduced alditols, such as sorbitol, and syrups naturally enriched with such materials, disaccharides, such as sucrose, isomaltose, trehalose, isolmaltulose, and syrups naturally enriched with such materials, trisaccharides, such as maltotriose, oligosaccharides, such as inulin, corn syrup, and maltodextrin, and polysaccharides. Accordingly, to produce a crunchier fruit or vegetable, a practitioner can choose to infuse the fruit or vegetable with an infusible molecule that will produce a crunchy, glassy structure.

Berries may then optionally be pre-dried to remove at least some moisture to achieve a moisture content that is less than that found in an untreated berry. For example, pre-drying of berries can be performed at a temperature of about 70° C. to about 120° C., e.g., about 80° C. to about 120° C., about 90° C. to about 120° C., about 100° C. to about 120° C., about 110° C. to about 120° C., about 70° C. to about 110° C., about 70° C. to about 100° C., about 70° C. to about 90° C., or about 70° C., 80° C., 90° C., 100° C., 110° C., or about 120° C., to dry the berries to about 20% moisture content or above, e.g., about 25%, 30%, 35%, 40%, 45%, 50%, 55%, 60%, 65%, 70%, 75%, or about 80%. Skilled practitioners will appreciate that any methods or apparatuses can potentially be used to dehydrate a whole or sliced fruit or vegetable, e.g., convection dryer, air dryer, infrared oven, microwave oven and/or air impinger. To expand the berries, they are exposed to a low atmospheric pressure, e.g., via a vacuum, e.g., an atmospheric pressure of about 0.1 mmHg to about 600 mmHg, e.g., about 0.1 to about 575 mmHg, about 10 to about 550 mmHg, about 20 to about 500 mmHg, about 30 to about 450 mmHg, about 40 to about 400 mmHg, about 50 to about 350 mmHg, about 60 to about 300 mmHg, about 70 to about 250 mmHg, about 80 to about 200 mmHg, about 90 to about 150 mmHg, about 100 to about 120 mmHg, about 10 to about 100 mmHg, about 20 to about 80 mmHg, about 20 to about 100 mmHg, about 50 to about 100 mmHg, about 75 to about 100 mmHg, or about 1 mmHg, 10 mmHg, 50 mmHg, 100 mmHg, 150 mmHg, 200 mmHg, 250 mmHg, 300 mmHg, 350 mmHg, 400 mmHg, 450 mmHg, 500 mmHg, or about 550 mmHg, and heated above the glass transition temperature of the berry, e.g., about 26° C. to about 110° C., e.g., about 28° C. to about 110° C., about 30° C. to about 110° C., about 35° C. to about 110° C., about 40° C. to about 110° C., about 45° C. to about 110° C., about 50° C. to about 110° C., about 55° C. to about 110° C., about 60° C. to about 110° C., about 65° C. to about 110° C., about 70° C. to about 110° C., about 75° C. to about 110° C., about 80° C. to about 110° C., about 85° C. to about 110° C., about 90° C. to about 110° C., about 95° C. to about 110° C., about 100° C. to about 110° C., about 105° C. to about 110° C., about 26° C. to about 105° C., about 26° C. to about 100° C., about 26° C. to about 95° C., about 26° C. to about 90° C., about 26° C. to about 85° C., about 26° C. to about 80° C., about 26° C. to about 75° C., about 26° C. to about 70° C., about 26° C. to about 65° C., about 26° C. to about 60° C., about 26° C. to about 55° C., about 26° C. to about 50° C., about 26° C. to about 45° C., about 26° C. to about 40° C., about 26° C. to about 35° C., about 26° C. to about 30° C., or about 26° C., 30° C., 35° C., 40° C., 45° C., 50° C., 55° C., 60° C., 65° C., 70° C., 75° C., 80° C., 85° C., 90° C., 95° C., 100° C., 105° C., or about 110° C. The source of heat is typically radiation, such as infrared or microwave, however, conduction or convection heating may also be utilized. Due to the below-atmospheric pressure, the whole, dried fruit or vegetable will expand to near the initial size of the fruit or vegetable, e.g., greater than or about 55%, 60%, 65%, 70%, 75%, 80%, 85%, 90%, or greater than or about 95% of the volume of the original fruit and vegetable.

The expanded berries can then be dehydrated under vacuum to "lock-in" the expanded configuration of the fruit or vegetable. When the berries are brought back to room temperature after drying (e.g. cooled down if dehydrated with heat), the berries remain puffy even when the vacuum is removed. Typically, more dehydration of the fruit or vegetable can produce a crunchier product. Therefore, if a crunchier product is desired, the fruit or vegetable should be dehydrated to a low enough moisture content (e.g., about 7% or less) so that the glass transition temperature is above room temperature, and the majority of the product remains in a glassy state after cooling, e.g., to about room temperature. See, FIG. 4. Conversely, if a non-crunchy, but puffed product is desired, the product can be dehydrated to a moisture content of greater than about 7%, e.g., about 7 to about 15%, about 8 to about 14%, about 9 to about 12%, or about 10 to about 12%. See, FIG. 4.

In one exemplary method, partially dried fruit or vegetable products, in a relatively crumbly/powdery state after pre-drying, can be placed under vacuum at a temperature above the glass transition temperature to expand the dried fruit or vegetable product using, for example, a vacuum microwave or a vacuum infrared or a fluid bed dryer with a vacuum of about 150 mmHg, e.g., about 100 mmHg, 110 mmHg, 120 mmHg, 130 mmHg, 140 mmHg, 160 mmHg, 170 mmHg, 180 mmHg, 190 mmHg, or about 200 mmHg. Alternatively, or additionally, a whole or sliced fruit or vegetable can be simultaneously expanded and dehydrated under vacuum using, for example, a vacuum dryer for a time sufficient to bring the berries to the desired final moisture content, e.g., in a range of about 1% to about 7%, e.g., about 1% to about 2%, about 1% to about 3%, about 1% to about 4%, about 1% to about 5%, about 2% to about 3%, about 2% to about 4%, about 2% to about 5%, about 3% to about 6%, about 4% to about 7%, about 5% to about 7%, or about 1%, 2%, 3%, 4%, 5%, 6%, or about 7%. Skilled practitioners will appreciate that any methods or commercially available apparatuses can potentially be used to dehydrate a whole or sliced fruit or vegetable. For example, the berries can be dehydrated in the same apparatus used to expand the berries or in a different apparatus and at the same vacuum pressure or a reduced vacuum pressure. By decreasing the moisture content of the fruit or vegetable to about 1% to about 7%, the glass transition temperature of the fruit or vegetable will be raised above room temperature, e.g., about 35° C. or about 40° C., so that the fruit or vegetable will retain a glassy, crunchy structure even at or below room temperature.

The berries can then be cooled while still under vacuum to a temperature below the glass transition temperature of the berries, e.g., to about 0° C. to about 40° C., about 4° C. to about 30° C., about 10° C. to about 25° C., about 15° C. to about 30° C., about 20° C. to about 30° C., or about 0° C., 4° C., 10° C., 15° C., 17° C., 20° C., 22° C., 25° C., 30° C., 35° C., or about 40° C., while maintaining or reducing vacuum pressure to lock in the structure of the expanded berries. Skilled practitioners will appreciate that any method or apparatus can potentially be used to cool the berries, and the apparatus can be the same apparatus used to expand and/or dehydrate the berries or a different apparatus. After cooling, the vacuum can be released. Following release of the vacuum, the berries can optionally be packaged, e.g., in a high moisture barrier package.

Alternatively, rather than dehydrating and cooling the berries under vacuum, the expanded berries can be freeze-dried under vacuum at below 4.579 mmHg, and then sublimed under vacuum. When puffing, freeze-drying, and subliming is the chosen method, the aforementioned pre-drying step is required, and is not optional (see FIG. 3). Pre-drying the berries before freeze-drying provides a more optimal texture than freeze-drying alone. Without being bound by theory, the pre-drying operation may allow sugar crystals in the berry to rearrange forming a quasi-crystal that gives the product a unique crunch. Pre-drying the berries before freeze-drying also shortens the freeze-drying step as there is less moisture content remaining in the berries when the freeze-drying step begins. Additionally, pre-drying the berries reduces costs and manufacturing time as the freeze-drying process after pre-drying can be shortened in comparison to the freeze-drying process for berries that are not pre-dried.

In another process, the berries can be puffed under vacuum, freeze-dried under vacuum, sublimed under vacuum, and then dehydrated above the triple point under vacuum. In this process, the pre-drying step is optional. This process has a temperatures range of about −40° C. to about 110° C.

Skilled practitioners will appreciate that the berries can be freeze-dried and sublimed in the same apparatus used to expand the berries or in a different apparatus. Skilled practitioners will also appreciate that the berries may be pre-dried and then subjected to vacuum to puff the berries back up before freeze-drying. Alternatively, only up to about 600 mmHg is required to puff the fruit back up before freezing, followed by further reduction of vacuum to 4.579 mmHg, before the normal freeze-drying process is carried out. Further, the same vacuum pressure or a reduced vacuum pressure can be used to freeze-dry and sublime the expanded berries. When the berries are brought back to room temperature after drying (e.g. warmed up after freeze-drying), the berries remain puffy and crunchy even when the vacuum is removed.

In another process, the berries can be frozen and then freeze-dried under vacuum. Freeze-drying may also include subliming under vacuum. The berries can then be dehydrated above the triple point under vacuum and then cooled under vacuum. These berries are puffed during the transition from subliming under vacuum to dehydrating under vacuum as the temperature is increased.

In in some instances, it can be advantageous to pre-freeze the fruit, e.g., at about 0° C., −10° C., −20° C., −30° C., −40° C., −50° C., −60° C., or about −70° C., prior to vacuum drying the fruit, e.g., at about 0.1 to 10 mbar, e.g., about 0.7 mbar.

Figure 5:
FIG. 5 is a photograph of a freeze-dried cranberry product produced by the methods described herein.
Figure 6:
FIG. 6 is a photograph of a freeze-dried cranberry product produced by the methods described herein.
Figures 7A, 7B:
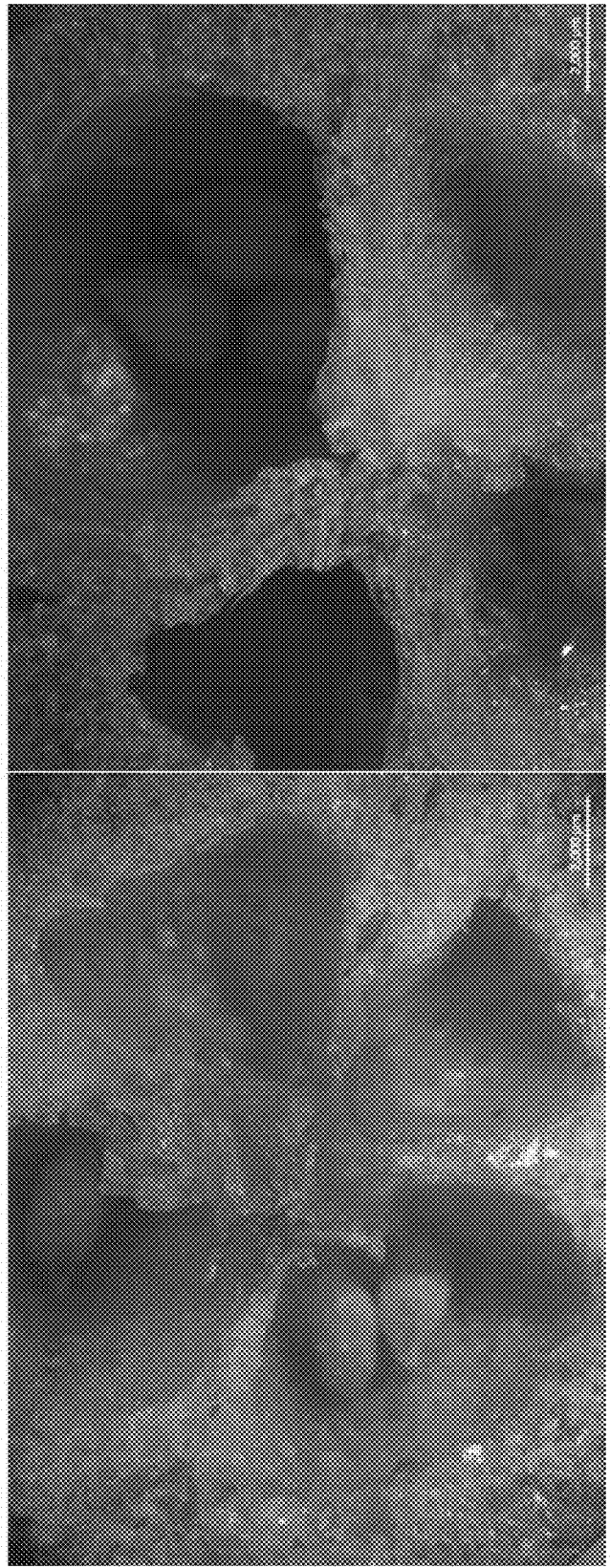
FIG. 7A is a photograph of commercially available freeze-dried cranberries without infusion.
FIG. 7B is a photograph of freeze dried cranberries with infused cranberry products produced by the methods described herein.
Figures 8A, 8B:
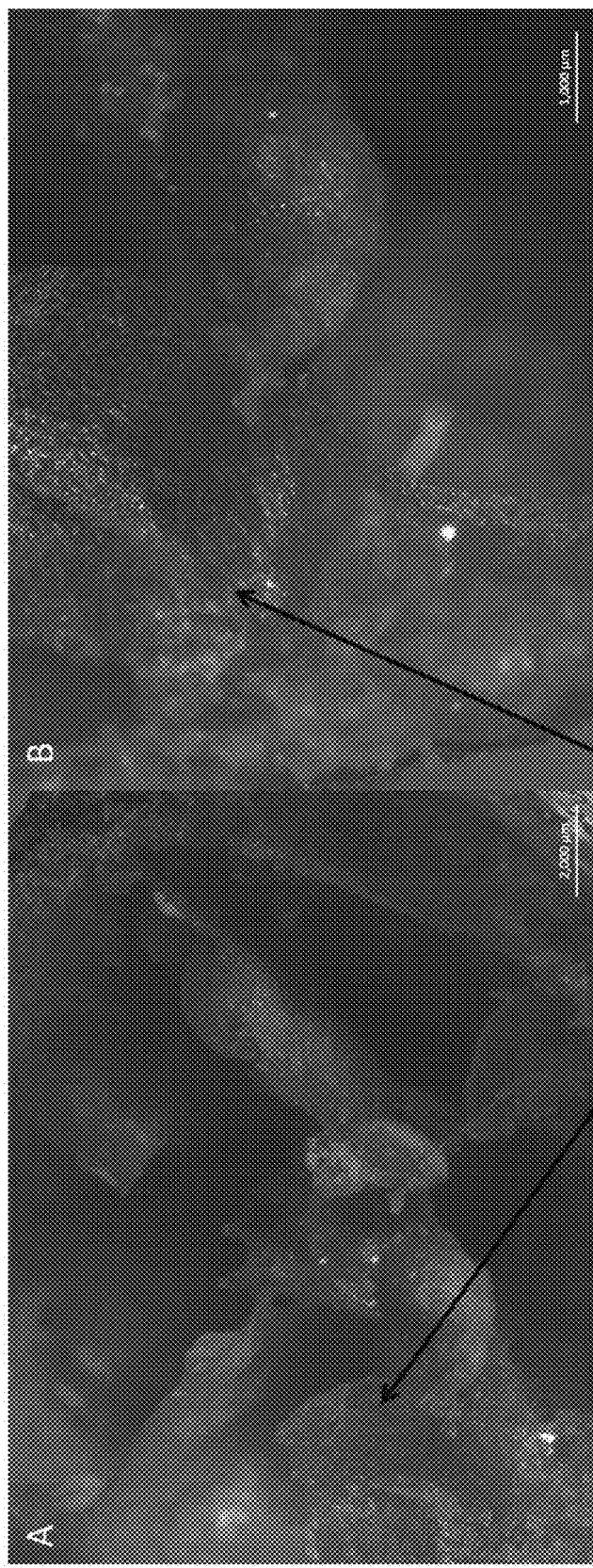
FIG. 8A is a photograph of an infused, crunchy cranberry dried under vacuum at 8× magnification.
FIG. 8B is a photograph of an infused, crunchy cranberry dried under vacuum at 16× magnification.
Figure 9:
FIG. 9 is a photograph of a cranberry product produced by the methods described in Example 2.
Figure 10:
FIG. 10 is a photograph of a cranberry product produced by the methods described in Example 2.

Upon infusion to a moisture content of about 1 to 7%, e.g., about 1%, 2%, 3%, 4%, 5%, 6%, or about 7%, the puffy, infused cranberry product was surprisingly crunchy. See, FIGS. 5 and 6. In contrast, regular, commercially-available freeze dried berries are not infused and not crunchy. Also surprising is that infusion does not change the cell structure of the berries significantly, if the berries are not subjected to a drastic pre-drying heat treatment, even though the product texture is very different (FIGS. 7A and 7B), and even while sugars form within the berries in a glassy state (FIGS. 8A and 8B). FIG. 8A is a photograph of an infused, crunchy cranberry dried under vacuum at 8× magnification. FIG. 8B is a photograph of an infused, crunchy cranberry dried under vacuum at 16× magnification. Exemplary berry products are pictured in FIGS. 9 and 10 produced using a vacuum oven, as described in Example 2. As seen in FIGS. 9 and 10, products produced using the methods described herein have a unique appearance. It is notable that the berry products shown in FIGS. 9 and 10 generally maintain their color, shape and size, as compared to the berry prior to treatment. The berry products also take on a glassy appearance following treatment.

Food Products

The present disclosure also provides food products that include the fruit and/or vegetable products described herein.

For example, the fruit and/or vegetable product can be included as an ingredient in ready to eat cereals. Such food products can also be in the form of a mass, e.g., a cereal bar, protein bar, granola bar, or chocolate bar. For example, fruit and vegetable products can be admixed with cereal and formed into a bar such as with a binder. In some embodiments, the bars can include one or more separate layer(s) or region(s) that include(s) the fruit or vegetable product. Alternatively, or in addition, bars can include an outer coating of the fruit and/or vegetable product, i.e., where the fruit and/or vegetable product coats at least a part of, e.g., the entire, surface of the bar. Fruit and vegetable products described herein can be coated with a coating to alter the taste and/or appearance of the product, e.g., sugar, spices, seasonings (e.g., chipotle lime), oils, oil blends, chocolate, yogurt, flavorings, natural flavorings, or other suitable ingredients to affect taste and texture. For example, a fruit and vegetable product may be coated with a sunflower oil (or other suitable oil type) blend containing an oil-soluble flavoring.

The fruit and vegetable products can also be added to products such as fruit cups, baked goods, confections (e.g., chocolates), and salads (e.g., prepackaged salads and salad kits). The fruit and vegetable products can be added to a variety of other food products such as dry mixes for baked goods, snack or trail mixes.

The fruit and vegetable products are also suitable for inclusion into a wide variety of dairy products. For example, the fruit and vegetable products can be added to yogurt to provide products that not only provide the nutrition and taste appeal of fruit or vegetable, but also provide high levels of fiber. Also, the fruit and vegetable products can be added to a variety of frozen dairy products such as ice cream or soft serve frozen dairy products. The fruit products can be added to nondairy frozen desserts such as sorbets or frozen fruit bars.

The fruit and vegetable products disclosed herein can be used in or as nutraceuticals and/or as food supplements. For example, the fruit and vegetable products can be used to supplement a food or beverage to enhance the health benefits conferred by the food or beverage. For example, the products can be used to supplement yogurt. The products can be packaged in bulk or packaged for individual servings and shipped to the consumer. For example, each package of products can contain multiple dried fruit and/or vegetable products in a sealed container, where the container does not transmit much moisture vapor, e.g., a low-moisture or an airtight, waterproof container. Alternatively, or in addition, a package of fruit and/or vegetable products can include a desiccant to maintain a lower moisture environment.

EXAMPLES

The invention is further described in the following examples, which do not limit the scope of the invention described in the claims.

Example 1

Frozen cranberries with diameter larger than 10 mm, were slightly thawed to make the skin of the berries slightly pliable. Partially thawed berries were then scarified and infused with sugar syrup to 30° Brix at room temperature. The infused berries were then dried to 50° Brix using an air impingement oven at 90° C. Sunflower oil at 0.5% of the weight of partially dried berries was sprayed on the surface of the partially dried wrinkled berries. The berries were then placed in a vacuum oven at 29.7 in Hg pressure (0.1 psi of vacuum) preheated to 90° C. The oven temperature was turned off and the vacuum chamber was allowed to cool down to 40° C. before the vacuum was released from the chamber.

Example 2

Frozen cranberries with diameter larger than 15 mm were slightly thawed to make the skin of the berries slightly pliable. Partially thawed berries were then pricked by passing the berries through a double roll with mounted needles. The berries were then infused with sugar syrup to 35° Brix that was heated to 55° C. The infused berries were then dried to 45° Brix using an air fryer at 99° C. Sunflower oil, flavored with natural fruit flavor was sprayed on the berries at 0.55% of the weight of partially dried berries. The berries were then placed in a vacuum oven at 29.7 in Hg pressure (0.1 psi of vacuum) preheated to 100° C. The oven temperature was then reduced to 70° C. and then after 5 hours was reduced to 40° C. for the vacuum chamber and the product to cool down to 40° C. before the vacuum was released from the chamber. Exemplary berry products are shown in FIGS. 9 and 10.

Example 3

Figure 11:
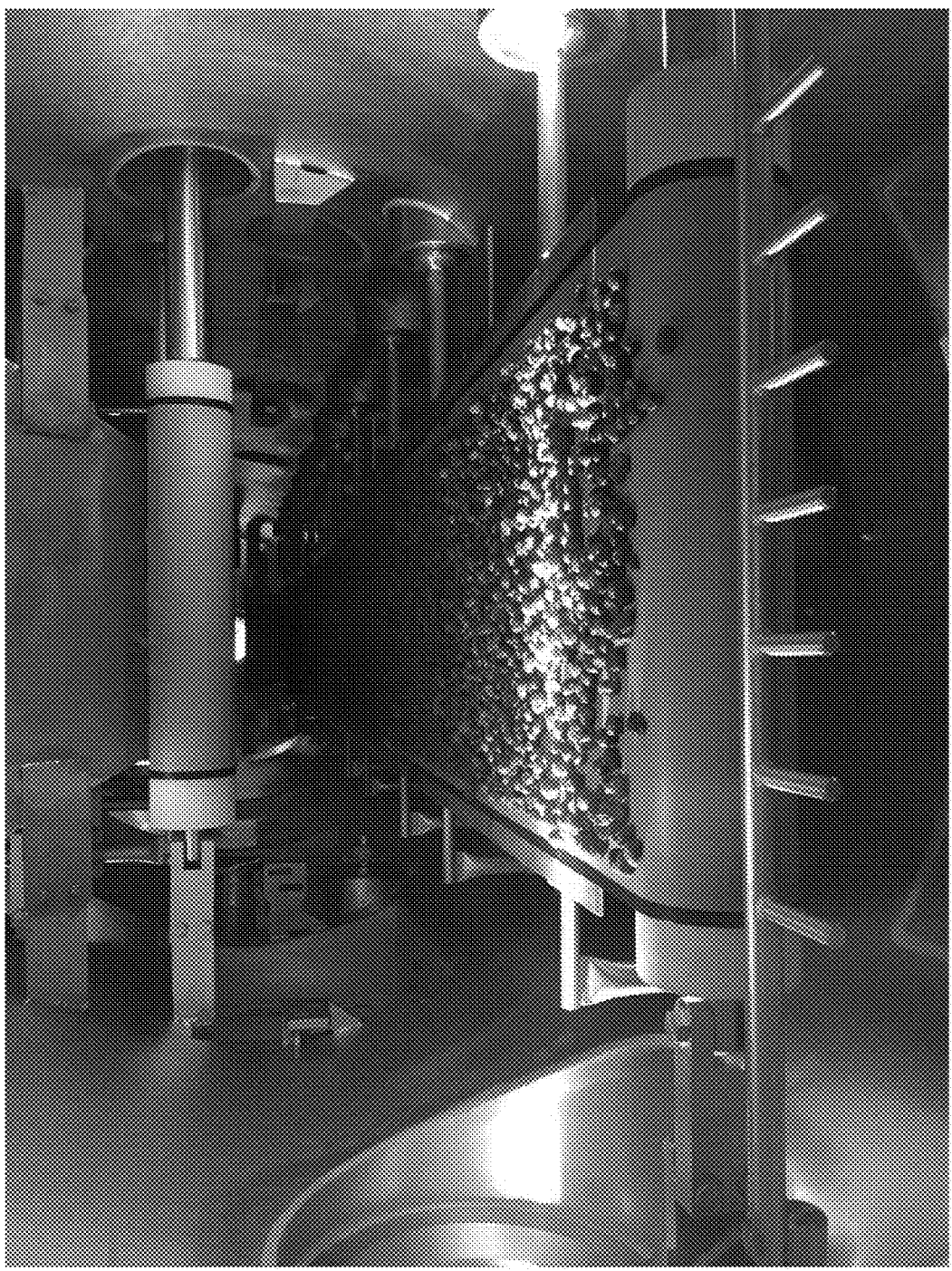
FIG. 11 is a photograph of cranberry products produced by the methods described in Example 3.
Figure 12:
FIG. 12 is a photograph of cranberry products produced by the methods described in Example 3.

Cranberries were cleaned and sorted. The cranberries were then slightly thawed, scarified and then infused with sugar syrup. Infusion can be performed to various amounts, e.g., to a range of about 10 to 30° Brix. Here, infusion was performed to about 25° Brix, at room temperature. The infused cranberries were then pre-dried. Pre-drying can be performed to a range of levels, depending on the procedure, e.g., to a range of about 40 to 55° Brix. Here, the cranberries were pre-dried to about 45° Brix. The cranberries were then frozen at about −40° C. Skilled practitioners will appreciate that a range of freezing temperatures are possible, e.g., about −1° C. to about −40° C. The cranberries were then vacuum-dried below the triple point of water (at about 0.7 mbar), first at about 80° C. for about 6.5 hours followed by 50° C. for about 0.5 hours. Skilled practitioners will appreciate that different vacuum pressures may be used, e.g., in the range of about 0.7 to about 10 mbar, as well as different vacuum temperatures (e.g., a first temperature in the range of about 70 to 90° C. and then a reduced temperature of about 40 to 60° C.) while the sublimation conditions are ensured. The vacuum drying step was carried out for about 7 hours, but the time can be varied depending, e.g., on the mass of berries to be treated. The final product was a product above 90° Brix, and was crunchy and rounded as shown in FIGS. 11 and 12.

Other Embodiments

It is to be understood that while the invention has been described in conjunction with the detailed description thereof, the foregoing description is intended to illustrate and not limit the scope of the invention, which is defined by the scope of the appended claims. Other aspects, advantages, and modifications are within the scope of the following claims.

What is claimed is:
1. A method for producing a fruit or vegetable product, wherein the method consist essentially of:
(a) infusing a whole or sliced fruit or vegetable with an infusible molecule to about 10 to about 55° Brix;

(b) pre-drying the whole or sliced fruit or vegetable at a temperature of about 80° C. to about 120° C. to produce a pre-dried fruit or vegetable;

(c) freezing the pre-dried fruit or vegetable at a temperature of about −1° C. to about −40° C. to produce a frozen fruit or vegetable;

(d) exposing the frozen fruit or vegetable to a temperature of about −1° C. to about −40° C. and an atmospheric pressure of about 0.53 mmHg to about 7.5 mmHg, thereby partially subliming the frozen fruit or vegetable;

(e) puffing the fruit or vegetable under vacuum of about 0.1 mmHg to about 600 mmHg at a temperature of about 40° C. to about 110° C.;

(f) cooling the fruit or vegetable under vacuum to a temperature of about 0° C. to about 40° C., to thereby produce the fruit or vegetable product, wherein steps (a) through (f) are performed sequentially.

2. The method of claim 1, wherein the whole or sliced fruit or vegetable in step (a) is scarified or pricked prior to infusing.

3. The method of claim 2, wherein juice is extracted from the whole or sliced fruit or vegetable in step (a) prior to infusing.

4. The method of claim 1, wherein the infusible molecule is selected from the group consisting of a monosaccharide, disaccharide, trisaccharide, oligosaccharide, polysaccharide, fiber, vitamins, minerals, proteins, flavors, salt, seasoning, or any combination thereof.

5. The method of claim 1, wherein the whole or sliced fruit or vegetable is pre-dried in step (b) to a moisture content of about 20% to about 40%.

6. The method of claim 1, wherein the whole or sliced fruit or vegetable is pre-dried in step (b) to a moisture content of about 40% to about 60%.

7. The method of claim 1, wherein pre-drying the fruit or vegetable is performed with a convection dryer, air dryer, impingement dryer, microwave, infrared dryer, and/or air impinger.

8. The method of claim 1, wherein the vacuum pressure during puffing is about 10 mmHg to about 600 mmHg.

9. The method of claim 1, wherein the whole or sliced fruit or vegetable is a cranberry.

10. The method of claim 1, wherein the whole or sliced fruit or vegetable is dehydrated under vacuum in step (e).

11. The method of claim 1, wherein a vacuum of about 0.1 mmHg to about 600 mmHg and heat at a temperature of about 40° C. to about 70° is applied to the whole or sliced fruit or vegetable in step (e) prior to cooling the fruit or vegetable.

12. The method of claim 1, wherein a vacuum of about 0.1 mmHg to about 600 mmHg and heat at a temperature of about 70° C. to about 110° C. is applied to the whole or sliced fruit or vegetable in step (e) prior to cooling the fruit or vegetable.

13. The method of claim 1, wherein the fruit or vegetable product has a moisture content of about 1% to about 7%.

14. The method of claim 1, wherein the fruit or vegetable product has a moisture content of about 7% to about 15%.

15. The method of claim 1, wherein the whole or sliced fruit or vegetable is frozen in step (c) under vacuum.

16. A method for producing a fruit or vegetable product, wherein the method consists essentially of:

(a) infusing a whole or sliced fruit or vegetable with an infusible molecule to about 10° to about 55° Brix;

(b) pre-drying the whole or sliced fruit or vegetable at a temperature of about 80° C. to about 120° C. to produce a pre-dried fruit or vegetable;

(c) exposing the pre-dried fruit or vegetable to a temperature of about −1° C. to about −40° C. and a pressure of about 0.53 mmHg to about 7.5 mmHg, thereby partially subliming the fruit or vegetable;

(d) puffing the fruit or vegetable under vacuum of about 0.1 mmHg to about 600 mmHg at a temperature of about 40° C. to about 110° C.;

(e) cooling the fruit or vegetable under vacuum to a temperature of about 0° C. to about 40° C., to thereby produce the fruit or vegetable product, wherein steps (a) through (e) are performed sequentially.

17. The method of claim 16, wherein the whole or sliced fruit or vegetable in step (a) is scarified or pricked prior to infusing.

18. The method of claim 16, wherein juice is extracted from the whole or sliced fruit or vegetable in step (a) prior to infusing the fruit or vegetable.

19. The method of claim 16, wherein the infusible molecule is selected from the group consisting of a monosaccharide, disaccharide, trisaccharide, oligosaccharide, polysaccharide, fiber, vitamins, minerals, proteins, flavors, salt, seasoning, or any combination thereof.

20. The method of claim 16, wherein the whole or sliced fruit or vegetable is pre-dried in step (b) to a moisture content of about 20% to about 40%.

21. The method of claim 16, wherein the whole or sliced fruit or vegetable is pre-dried in step (b) to a moisture content of about 40% to about 60%.

22. The method of claim 16, wherein pre-drying the fruit or vegetable is performed with a convection dryer, air dryer, impingement dryer, microwave, infrared dryer, and/or air impinger.

23. The method of claim 16, wherein the vacuum pressure during puffing is about 10 mmHg to about 600 mmHg.

24. The method of claim 16, wherein the whole or sliced fruit or vegetable is a cranberry.

25. The method of claim 16, wherein the whole or sliced fruit or vegetable is dehydrated under vacuum in step (d).

26. The method of claim 16, wherein a vacuum of about 0.1 mmHg to about 600 mmHg and heat at a temperature of about 40° C. to about 70° C. is applied to the whole or sliced fruit or vegetable in step (d) prior to cooling the fruit or vegetable.

27. The method of claim 16, wherein a vacuum of about 0.1 mmHg to about 600 mmHg and heat at a temperature of about 70° C. to about 110° C. is applied to the whole or sliced fruit or vegetable in step (d) prior to cooling the fruit or vegetable.

28. The method of claim 16, wherein the fruit or vegetable product has a moisture content of about 1% to about 7%.

29. The method of claim 16, wherein the fruit or vegetable product has a moisture content of about 7% to about 15%.

30. A method for producing a fruit or vegetable product, wherein the method consists essentially of:

(a) infusing a whole or sliced fruit or vegetable with an infusible molecule to of about 10° to about 55° Brix;

(b) pre-drying the whole or sliced fruit or vegetable at a temperature of about 80° C. to about 120° C. to produce a pre-dried fruit or vegetable;

(c) freezing the pre-dried fruit or vegetable at a temperature of about −1° C. to about −40° C. to produce a frozen fruit or vegetable;

(d) exposing the frozen fruit or vegetable to a temperature of about −1° C. to about −40° C. and an atmospheric pressure of about 0.53 mmHg to about 7.5 mmHg, thereby partially subliming the frozen fruit or vegetable;

(e) puffing the fruit or vegetable under vacuum of about 0.1 mmHg to about 600 mmHg at a temperature of about 40° C. to about 110° C.;

(f) bringing the temperature to of about 0° C. to about 40° C., to thereby produce the fruit or vegetable product, wherein steps (d) and (e) are performed sequentially.

31. The method of claim 30, wherein the whole or sliced fruit or vegetable is pre-dried in step (b) to a moisture content of about 20% to about 40%.

32. The method of claim 30, wherein the whole or sliced fruit or vegetable is pre-dried in step (b) to a moisture content of about 40% to about 60%.

33. The method of claim 30, wherein pre-drying the fruit or vegetable is performed with a convection dryer, air dryer, impingement dryer, microwave, infrared dryer, and/or air impinger.

34. The method of claim 30, wherein the vacuum pressure during puffing is about 10 mmHg to about 600 mmHg.

35. The method of claim 30, wherein the whole or sliced fruit or vegetable is a cranberry.

36. The method of claim 30, wherein the whole or sliced fruit or vegetable is dehydrated under vacuum in step (d).

37. The method of claim 30, wherein a vacuum of about 0.1 mmHg to about 600 mmHg and heat at a temperature of about 40° C. to about 70° C. is applied to the whole or sliced fruit or vegetable in step (e) prior to cooling the fruit or vegetable.

38. The method of claim 30, wherein a vacuum of about 0.1 mmHg to about 600 mmHg and heat at a temperature of about 70° C. to about 110° C. is applied to the whole or sliced fruit or vegetable in step (e) prior to cooling the fruit or vegetable.

39. The method of claim 30, wherein the fruit or vegetable product has a moisture content of about 1% to about 7%.

40. The method of claim 30, wherein the fruit or vegetable product has a moisture content of about 7% to about 15%.

41. The method of claim 30, wherein freezing the pre-dried fruit or vegetable consists essentially of freezing the pre-dried fruit or vegetable under vacuum.

42. A method for producing a fruit or vegetable product, wherein the method consists essentially of:

(a) infusing a whole or sliced fruit or vegetable with an infusible molecule to of about 10° to about 55° Brix;

(b) pre-drying the whole or sliced fruit or vegetable at a temperature of about 80° C. to about 120° C. to produce a pre-dried fruit or vegetable;

(c) exposing the pre-dried fruit or vegetable to a temperature about −1° C. to about −40° C. and an atmospheric pressure of about 0.53 mmHg to about 7.5 mmHg thereby partially subliming the fruit or vegetable;

(d) puffing the fruit or vegetable under vacuum of about 0.1 mmHg to about 600 mmHg at a temperature of about 40° C. to about 110° C.;

(e) bringing the temperature to of about 0° C. to about 40° C., to thereby produce the fruit or vegetable product, wherein steps (c) and (d) are performed sequentially.

43. The method of claim 42, wherein the whole or sliced fruit or vegetable is pre-dried in step (b) to a moisture content of about 20% to about 40%.

44. The method of claim 42, wherein the whole or sliced fruit or vegetable is pre-dried in step (b) to a moisture content of about 40% to about 60%.

45. The method of claim 42, wherein pre-drying the fruit or vegetable is performed with a convection dryer, air dryer, impingement dryer, microwave, infrared dryer, and/or air impinger.

46. The method of claim 42, wherein the vacuum pressure during puffing is about 10 mmHg to about 600 mmHg.

47. The method of claim 42, wherein the whole or sliced fruit or vegetable is a cranberry.

48. The method of claim 42, wherein the whole or sliced fruit or vegetable is dehydrated under vacuum in step (d).

49. The method of claim 42, wherein a vacuum of about 0.1 mmHg to about 600 mmHg and heat at a temperature of about 40° C. to about 70° C. is applied to the whole or sliced fruit or vegetable in step (d) prior to cooling the fruit or vegetable.

50. The method of claim 42, wherein a vacuum of about 0.1 mmHg to about 600 mmHg and heat at a temperature of about 70° C. to about 110° C. C is applied to the whole or sliced fruit or vegetable in step (d) prior to cooling the fruit or vegetable.

51. The method of claim 42, wherein the fruit or vegetable product has a moisture content of about 1% to about 7%.

52. The method of claim 42, wherein the fruit or vegetable product has a moisture content of about 7% to about 15%.

* * * * *